US008999182B2

(12) United States Patent
Abo et al.

(10) Patent No.: US 8,999,182 B2
(45) Date of Patent: Apr. 7, 2015

(54) METHOD FOR MANUFACTURING LIQUID DISCHARGE HEAD

(71) Applicant: Canon Kabushiki Kaisha, Tokyo (JP)

(72) Inventors: Hiroyuki Abo, Kawasaki (JP); Keiji Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 13/921,101

(22) Filed: Jun. 18, 2013

(65) Prior Publication Data

US 2013/0341302 A1 Dec. 26, 2013

(30) Foreign Application Priority Data

Jun. 20, 2012 (JP) ................................ 2012-138388

(51) Int. Cl.
*G01D 15/00* (2006.01)
*B41J 2/16* (2006.01)

(52) U.S. Cl.
CPC .............. *B41J 2/1629* (2013.01); *B41J 2/1603* (2013.01); *B41J 2/1623* (2013.01); *B41J 2/1628* (2013.01); *B41J 2/1631* (2013.01); *B41J 2/1632* (2013.01); *B41J 2/1634* (2013.01); *B41J 2/1639* (2013.01); *B41J 2/1645* (2013.01)

(58) Field of Classification Search
None
See application file for complete search history.

(56) References Cited

U.S. PATENT DOCUMENTS

| | | | | |
|---|---|---|---|---|
| 2003/0222944 A1* | 12/2003 | Matsuzawa | ..................... | 347/68 |
| 2006/0077237 A1* | 4/2006 | Shin et al. | ..................... | 347/71 |
| 2009/0065481 A1* | 3/2009 | Kishimoto et al. | ............. | 216/87 |
| 2010/0079551 A1* | 4/2010 | Saito et al. | ..................... | 347/64 |
| 2010/0156990 A1* | 6/2010 | Morisue et al. | ................. | 347/44 |
| 2010/0255616 A1* | 10/2010 | Kokubo et al. | ................. | 438/21 |
| 2011/0041337 A1* | 2/2011 | Kato et al. | ................... | 29/890.1 |

FOREIGN PATENT DOCUMENTS

JP 2007-125725 A 5/2007

OTHER PUBLICATIONS

Kim et al, Design and Fabrication of Electrostatic Inkjet Head using Silicon Micromachining Technology, Jun. 2008, Journal of Semiconductor Technology and Science, vol. 8, No. 2, p. 121-127.*

* cited by examiner

*Primary Examiner* — Binh X Tran
*Assistant Examiner* — David Cathey, Jr.
(74) *Attorney, Agent, or Firm* — Canon USA Inc. IP Division

(57) ABSTRACT

A method for manufacturing a liquid discharge head includes a step of preparing a first substrate having an energy generating element at a front surface side thereof; a step of forming a wall member, which is to become a wall for a liquid flow passage, at the front surface side of the first substrate; a step of forming a mask having an opening on the wall member and forming a second substrate, which is composed of silicon and is to become an orifice plate, on the mask; and a step of forming a liquid supply port in the first substrate and a liquid discharge port in the second substrate by supplying an etchant from a back surface side of the first substrate, the back surface being a surface opposite the front surface.

10 Claims, 3 Drawing Sheets

METHOD FOR MANUFACTURING LIQUID DISCHARGE HEAD

BACKGROUND OF THE INVENTION

1. Field of the Invention

The present invention relates to methods for manufacturing liquid discharge heads.

2. Description of the Related Art

Liquid discharge devices are known as devices that discharge and apply liquid to printing media, such as paper, so as to print images thereon. A liquid discharge device has a liquid discharge head. The liquid discharge head has discharge ports from which the liquid is discharged.

One example of a liquid discharge head is an inkjet head. Japanese Patent Laid-Open No. 2007-125725 discusses a method for manufacturing such an inkjet head. First, a first substrate composed of, for example, silicon is prepared, and a first photosensitive resin layer is formed on or above the first substrate. A latent image pattern, which is to become an ink flow passage, is formed in the first photosensitive resin layer. Next, a sacrificial layer pattern is formed at the first photosensitive resin layer by using, for example, an aluminum layer. Subsequently, a second substrate composed of silicon is bonded to the first photosensitive resin layer, and the second substrate is dry-etched and wet-etched. By performing the etching, discharge ports are formed in the second substrate. Then, etching is performed from the opposite side of the first substrate, thereby forming an ink supply port in the first substrate. Finally, the latent image pattern is eluted, whereby an inkjet head is manufactured.

SUMMARY OF THE INVENTION

The present invention provides a method for manufacturing a liquid discharge head including a substrate having a liquid supply port; an energy generating element; and an orifice plate having a liquid discharge port. The method includes a step of preparing a first substrate having the energy generating element at a front surface side thereof; a step of forming a wall member, which is to become a wall for a liquid flow passage, at the front surface side of the first substrate; a step of forming a mask having an opening on the wall member and forming a second substrate, which is composed of silicon and is to become the orifice plate, on the mask; and a step of forming the liquid supply port in the first substrate and the liquid discharge port in the second substrate by supplying an etchant from a back surface side of the first substrate, the back surface being a surface opposite the front surface.

Further features of the present invention will become apparent from the following description of exemplary embodiments with reference to the attached drawings.

DESCRIPTION OF THE EMBODIMENTS

In the head manufactured in accordance with the method discussed in Japanese Patent Laid-Open No. 2007-125725, an orifice plate serving as a component used for forming the discharge ports is composed of silicon. Because the orifice plate is unlikely to be swollen by ink and the like, a highly-reliable head can be obtained.

However, in the manufacturing method discussed in Japanese Patent Laid-Open No. 2007-125725, the discharge ports and the ink supply port are formed from opposite sides of the head. Thus, the discharge ports and the ink supply port need to be formed separately in view of the etching time. This results in an increased number of steps since it is necessary to form, for example, etching protective films in two steps.

Therefore, the present invention provides a method for readily manufacturing a liquid discharge head having an orifice plate composed of silicon.

A detailed description of an embodiment of the present invention will be provided below.

Figure 1:
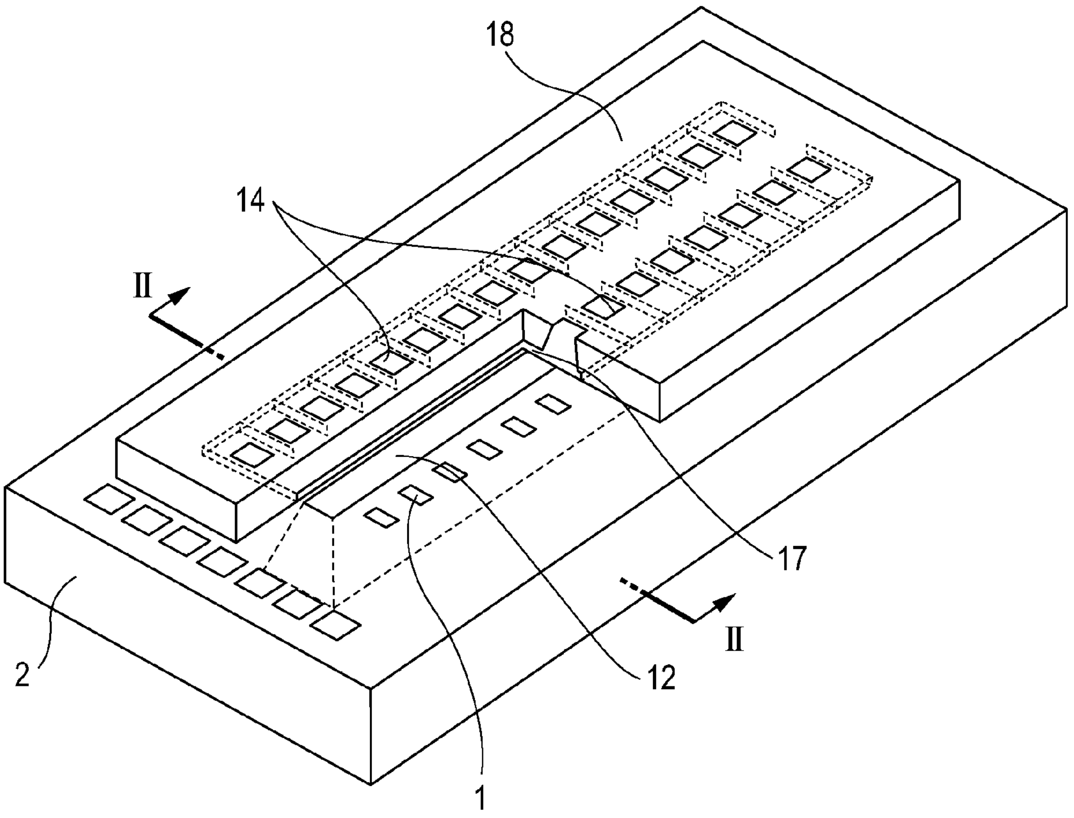
FIG. 1 illustrates an example of a liquid discharge head manufactured in accordance with the present invention.

FIG. 1 illustrates an example of a liquid discharge head manufactured in accordance with the present invention. In the liquid discharge head shown in FIG. 1, energy generating elements 1 that generate energy for discharging a liquid, such as ink, are formed at a predetermined pitch on a substrate 2. The energy generating elements 1 may be formed directly on the substrate 2 or may be formed above the substrate 2 with, for example, an insulation layer interposed therebetween. Alternatively, the energy generating elements 1 may be formed above the substrate 2 in a floating manner with a space interposed therebetween. The energy generating elements 1 may be heating elements (heaters) composed of, for example, TaSiN or may be composed of a piezoelectric material. The substrate 2 is composed of, for example, silicon. The energy generating elements 1 are arranged in two rows between which a liquid supply port 12 for supplying the liquid is formed. An orifice plate 18 is formed on or above the substrate 2. The orifice plate 18 is provided with discharge ports 14 at positions corresponding to the energy generating elements 1. A liquid flow passage 17 is formed between the discharge ports 14 and the liquid supply port 12. The liquid discharge head shown in FIG. 1 applies pressure generated by the energy generating elements 1 to the liquid supplied from the liquid supply port 12 via the liquid flow passage 17 so as to discharge the liquid as liquid droplets from the discharge ports 14. If the liquid is ink, the liquid discharge head is called an inkjet print head.

FIGS. 2A to 2I illustrate an example of a method for manufacturing the liquid discharge head according to the present invention, and are cross-sectional views taken along a plane extending perpendicularly to the first substrate 2 along line II-II in FIG. 1.

Figure 2A:
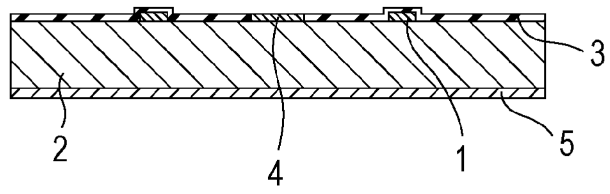
FIGS. 2A to 2I illustrate an example of a method for manufacturing the liquid discharge head according to the present invention.

Referring to FIG. 2A, in the present invention, a first substrate 2 having the energy generating elements 1 at the front surface side (i.e., the top surface in FIGS. 2A to 2I) thereof is first prepared. The front surface of each energy generating element 1 is preferably covered with an insulation layer 3 composed of, for example, SiN or Ta. Furthermore, a sacrificial layer 4 is preferably formed at the front surface side of the first substrate 2. The sacrificial layer 4 controls the opening width of a liquid supply port at the front surface of the substrate 2 and is composed of, for example, aluminum, a compound of aluminum and silicon, or an alloy of aluminum and copper. The back surface (i.e., the bottom surface in FIGS. 2A to 2I) of the first substrate 2 is provided with a back-surface layer 5 functioning as a mask in a subsequent etching process. An example of the back-surface layer 5 is a layer containing a silicon oxide film or polyether amide. Furthermore, the front surface of the first substrate 2 may be provided with, for example, an electrode pad for electrical connection, wiring for the energy generating elements 1, and a semiconductor element for driving the energy generating elements 1. The first substrate 2 may be composed of a material that can be etched in the subsequent etching process, and is preferably composed of, for example, silicon.

Figure 2B:
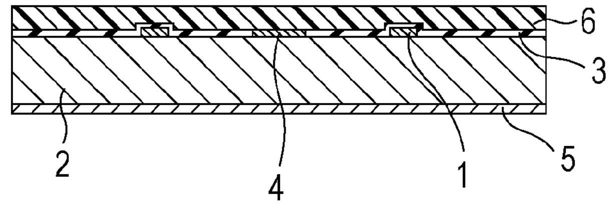

Subsequently, referring to FIG. 2B, a photosensitive resin layer 6 is formed over the front surface of the first substrate 2. The photosensitive resin layer 6 is formed by, for example, applying a resist containing photosensitive resin over the first substrate 2 by spin coating, or stacking a dry film containing photosensitive resin over the first substrate 2. An exposure process using, for example, an ultraviolet ray or a deep-UV ray is performed at the photosensitive resin layer 6 formed in this manner by using a photo-mask (not shown). Thus, the photosensitive resin layer 6 is patterned, whereby a flow passage pattern 7 is formed. Wall members 16, which are to become flow-passage walls later, are formed around the flow passage pattern 7. Specifically, the wall members 16 and the flow passage pattern 7 are formed from the photosensitive resin layer 6.

Figure 2C:
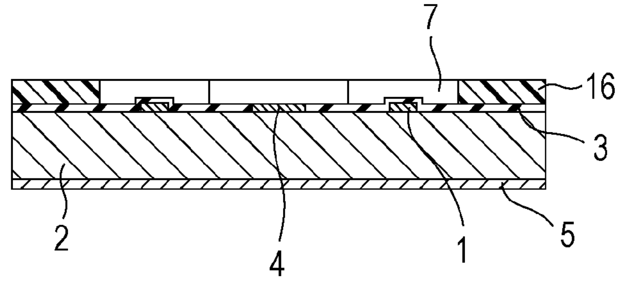

FIG. 2C illustrates an example in which the flow passage pattern 7 exists as a space between the wall members 16 as a result of a development process performed after the exposure process. However, the flow passage pattern 7 does not necessarily need to be developed at this point. In other words, the flow passage pattern 7 may be left in a latent-image state by not performing a development process after the exposure process. The flow passage pattern 7 is preferably left in a latent-image state so that a second substrate 8 and a mask 9, which will be described later, can be readily formed flat. The thickness of the photosensitive resin layer 6 preferably ranges between 5 μm and 30 μm in view of the fact that a part thereof will become a flow passage.

The photosensitive resin layer 6 may be a negative resist containing negative photosensitive resin or a positive resist containing positive photosensitive resin. However, in view of the fact that the photosensitive resin layer 6 will ultimately become the wall members 16, the photosensitive resin layer 6 is preferably a negative resist. In particular, a negative resist is preferably used if the flow passage pattern 7 is to be left in a latent-image state without being removed at this point. Examples of negative photosensitive resin include acrylic resin and cationic-polymerization-type epoxy resin. Examples of positive photosensitive resin include polymethyl isopropenyl ketone and a copolymer of methacrylic acid and methacrylate.

Figure 2D:
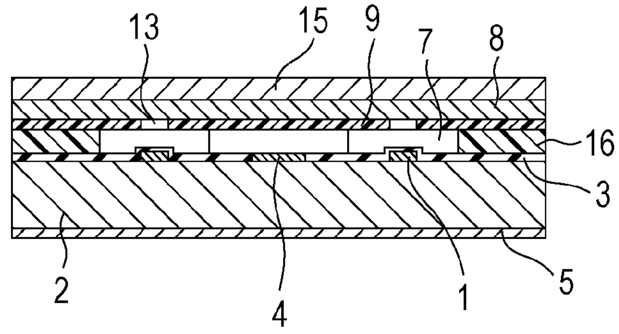

After the flow passage pattern 7 is formed, the mask 9 and the second substrate 8 are formed on the wall members 16, as shown in FIG. 2D. The second substrate 8 is formed over the mask 9 and is a silicon substrate composed of silicon. The second substrate 8 is to become an orifice plate. The mask 9 and the second substrate 8 may be stacked on the wall members 16 in that order. Alternatively, in order to enhance the fabrication accuracy, the mask 9 is preferably formed over the second substrate 8 in advance by, for example, spin coating, and then the second substrate 8 having the mask 9 is preferably bonded to the wall members 16.

The mask 9 is provided with openings 13. The openings 13 are to be supplied with an etchant in the subsequent etching process. The openings 13 may be formed in the mask 9 by dry etching or by using a laser. Alternatively, the openings 13 may be formed by photolithography. When the openings 13 are to be formed, the second substrate 8 is preferably secured on a suction stage. A support substrate 15 is preferably interposed between the second substrate 8 and the suction stage. Thus, damages to the second substrate 8 can be suppressed. When the first substrate 2 and the second substrate 8 are to be bonded to each other, the support substrate 15 may support the second substrate 8 from a side opposite to the side of the second substrate 8 to be bonded to the first substrate 2.

The mask 9 may be composed of a material with a high tolerance to the etchant used in the subsequent etching process, and is preferably composed of, for example, resin. Among various kinds of resin, polyether amide is preferably used. A mask containing polyether amide has a high tolerance to the etchant and also allows the wall members 16 and the second substrate 8 to be tightly attached to each other.

Furthermore, the mask 9 preferably has an alignment mark. By having an alignment mark, the mask 9 can be bonded to the wall members 16 with high accuracy. As an alternative to providing the mask 9 with an additional alignment mark, the openings 13 in the mask 9 may be used as alignment marks.

Discharge ports will be formed in the second substrate 8 in the subsequent etching process. Specifically, the second substrate 8 is to become an orifice plate. The thickness of the second substrate 8 preferably ranges between 5 μm and 80 μm in view of the fact that the discharge ports will be formed in the second substrate 8 by etching and that the second substrate 8 will become an orifice plate. The thickness of the second substrate 8 can be adjusted by, for example, backgrinding, CMP, or spin etching. The surface of the second substrate 8 to which the wall members 16 are bonded, that is, the surface of the second substrate 8 provided with the mask 9, is preferably a surface in which the crystal plane orientation is (100), that is, a so-called (100) surface. With this surface being a (100) surface, discharge ports with a good tapered shape can be formed, which will be described later.

Accordingly, after the first substrate 2 and the second substrate 8 are bonded to each other with the wall members 16 and the mask 9 interposed therebetween, the entire resultant body is heat-treated. Thus, the first substrate 2 and the second substrate 8 can be tightly bonded to each other by the wall members 16 and the mask 9.

Figure 2E:
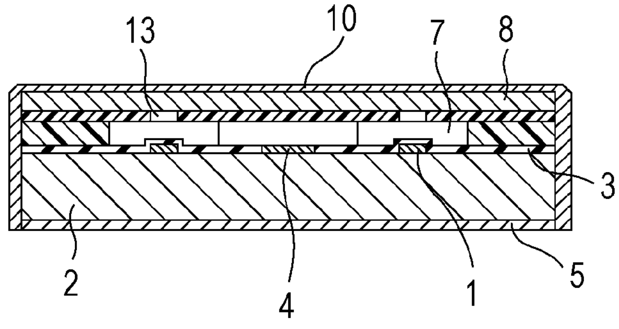

Subsequently, if the support substrate 15 is used, the support substrate 15 is removed, and a protective film 10 is formed so as to cover the second substrate 8. Referring to FIG. 2E, the protective film 10 covers the upper surface and the side surfaces of the second substrate 8, and preferably covers the side surfaces of the first substrate 2.

Figure 2F:
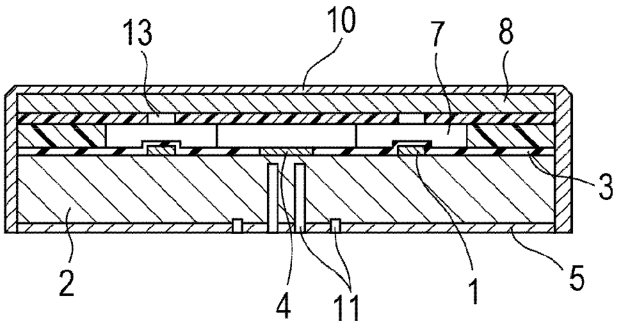

Then, referring to FIG. 2F, the back-surface layer 5 formed over the back surface of the first substrate 2 is irradiated with a laser beam or is dry-etched, whereby non-through holes (recesses) 11 are formed in the first substrate 2. By forming the non-through holes 11, openings are formed in the back-surface layer 5. This step is not necessarily required so long as the liquid supply port 12 can be formed in the first substrate 2. If the non-through holes 11 are not to be formed, the back-surface layer 5 is, for example, dry-etched so that an opening is formed in the back-surface layer 5.

Figure 2G:
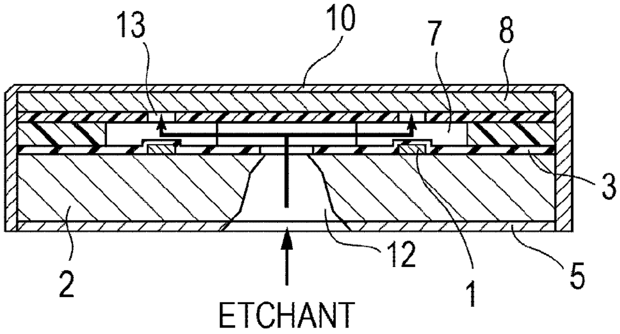

Next, referring to FIG. 2G, the etchant is supplied from the back surface of the first substrate 2, that is, the side opposite the front surface thereof. Thus, the liquid supply port 12 is formed in the first substrate 2. If the first substrate 2 is a silicon substrate composed of silicon, anisotropic etching using tetramethylammonium hydroxide (TMAH) or potassium hydroxide (KOH) as the etchant is preferably performed. In the case where anisotropic etching is performed, the etching proceeds from the back surface of the first substrate 2 until the etchant reaches the sacrificial layer 4 formed at the front surface side of the first substrate 2. The sacrificial layer 4 receiving the etchant dissolves at an extremely high rate, thereby defining the opening width of the liquid supply port 12 at the front surface of the first substrate 2. When multiple openings are formed in the back-surface layer 5, the back-surface layer 5 between the openings is removed as the etching proceeds, so that the opening of the liquid supply port 12 at the back surface of the first substrate 2 is given a shape shown in FIG. 2G.

In the case where the flow passage pattern 7 is a space as shown in FIG. 2G, the etchant reaching the front surface of the first substrate 2 immediately reaches the mask 9 by passing through this space. The etchant reaching the mask 9 begins etching the second substrate 8 from the openings 13 formed in the mask 9. On the other hand, if the photosensitive resin layer 6 remains in the flow passage pattern 7 in a latent-image state, the photosensitive resin layer 6 in the latent-image state is removed by the etchant. For example, if the photosensitive resin contained in the photosensitive resin layer 6 in the latent-image state is acrylic resin, the photosensitive resin layer 6 in the latent-image state can be removed by using a TMAH aqueous solution with a TMAH concentration ranging between 1% by mass and 25% by mass as the etchant. Accordingly, in the present invention, the first substrate 2 and the second substrate 8 can be etched in a single step.

Figure 2H:
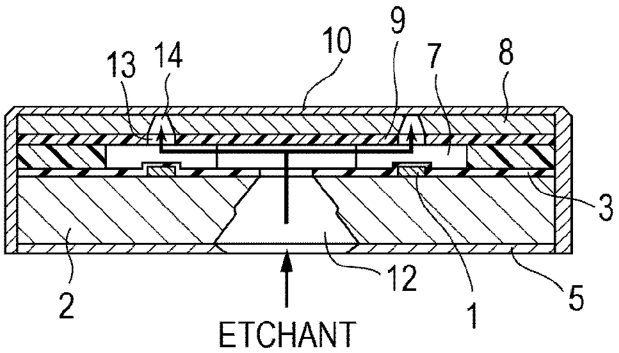

The second substrate 8 is a silicon substrate, and when the etchant reaches the second substrate 8, anisotropic etching is performed thereon. By performing anisotropic etching, the discharge ports 14 can be formed in the second substrate 8, as shown in FIG. 2H. As described above, when the surface of the second substrate 8 bonded to the wall members 16 is a (100) surface, a 54.7° (111) surface appears from the bonded surface. Consequently, referring to FIG. 2H, the cross-sectional area within the second substrate 8 taken in a direction parallel to the front surface of the first substrate 2 gradually decreases in the vertical direction, whereby so-called tapered discharge ports can be formed. Furthermore, since a (111) surface has a high tolerance to liquid, such as ink, the reliability of the inner walls of the discharge ports 14 can be increased. If the discharge ports 14 are to be given a straight shape in which the cross-sectional area taken in the direction parallel to the front surface of the first substrate 2 is uniform in the vertical direction, the surface of the second substrate 8 bonded to the wall members 16 may be a (110) surface. Alternatively, discharge ports with a different shape may be formed by forming non-through holes at positions of the second substrate 8 that correspond to the openings 13 in the mask 9 by using, for example, a laser. By forming the non-through holes, the etching time can be shortened.

The width of each opening 13 in the mask 9 significantly affects the shape of the discharge ports 14. In the case where the surface of the second substrate 8 bonded to the wall members 16 is a (100) surface and non-through holes are not formed in the second substrate 8, the width of each opening 13 in the mask 9 satisfies the following relational expression:

$$a=((b/\tan 54.7)\times 2)+c$$

where a denotes the width (μm) of each opening 13 in the mask 9, b denotes the thickness (μm) of the second substrate 8, and c denotes the opening width (μm) at the opening-plane side (i.e., the upper side in FIG. 2H) of the corresponding discharge port 14. Therefore, by using this relational expression, the width of each opening 13 in the mask 9 can be determined.

The liquid supply port 12 in the first substrate 2 and the discharge ports 14 in the second substrate 8 can be formed substantially at the same time by adjusting, for example, the formation conditions, such as the thicknesses of the first substrate 2 and the second substrate 8, the composition of the etchant, and guide holes.

The time that it takes to form the discharge ports 14 in the second substrate 8 is substantially equal to the time that it takes to form the liquid supply port 12 in the first substrate 2 after the etchant penetrates therethrough. If the etching process for the liquid supply port 12 takes an extremely long time, the opening width of the liquid supply port 12 at the front surface of the first substrate 2 becomes too large, resulting in over-etching. The thickness of the second substrate 8 and the width of each opening 13 in the mask 9 are preferably determined in view of a tolerance time for over-etching.

Figure 2I:
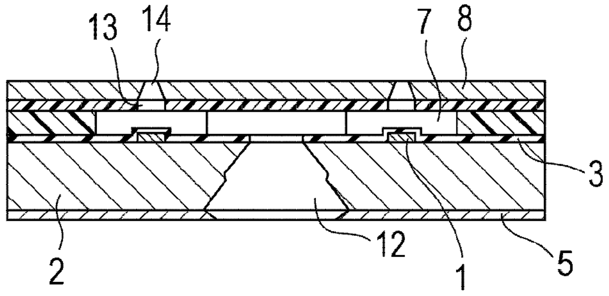

After the liquid supply port 12 and the discharge ports 14 are formed upon completion of the above steps, the protective film 10 is removed, whereby a liquid discharge head shown in FIG. 2I is manufactured. In the present invention, the etchant is supplied from the back surface of the first substrate 2, that is, the surface opposite the front surface thereof, so that the liquid supply port 12 can be formed in the first substrate 2 and the liquid discharge ports 14 can be formed in the second substrate 8. In the liquid discharge head manufactured in accordance with the present invention, an orifice plate is formed of the second substrate 8, which is a silicon substrate.

EXEMPLARY EMBODIMENTS

The present invention will be described in further detail with reference to exemplary embodiments.

First Exemplary Embodiment

First, as shown in FIG. 2A, a first substrate 2 with a thickness of 725 μm and having energy generating elements 1 composed of TaSiN at the front surface side thereof is prepared. The first substrate 2 is a silicon substrate in which the crystal plane orientation of the surface having the energy generating elements 1 is (100). The front surface of the first substrate 2 is provided with, for example, a sacrificial layer 4 composed of aluminum, an electrode pad for electrical connection, wiring for the energy generating elements 1, and a semiconductor element for driving the energy generating elements 1. The energy generating elements 1 and the wiring therefor are covered with an insulation layer 3 composed of SiN. An alignment mark to be used when bonding a mask in a subsequent step is formed in the first substrate 2. A back-surface layer 5, which is a silicon oxide film, is formed over the back surface of the first substrate 2.

Subsequently, a coating liquid containing 100 parts by mass of EHPE-3150 (product name, manufactured by Daicel Chemical Industries, Ltd.), 5 parts by mass of A-187 (product name, manufactured by Nippon Unicar Company Limited), 6 parts by mass of SP170 (product name, manufactured by Asahi Denka Kogyo K.K.), and 80 parts by mass of xylene is prepared. This coating liquid is applied onto the first substrate 2 to a thickness of 20 μm by spin coating, whereby a photosensitive resin layer 6, which is a negative resist, is formed over the front surface of the first substrate 2, as shown in FIG. 2B. Then, an exposure process using a mercury spectral line in a wavelength region of 365 mm is performed, and a development process using a liquid mixture containing 60% by mass of xylene and 40% by mass of methyl isobutyl ketone is performed, whereby a flow passage pattern 7 is formed, as shown in FIG. 2C. The flow passage pattern 7 is a space surrounded by wall members 16 formed to a thickness of 20 μm.

Next, a second substrate 8 processed to a thickness of 10 μm is prepared. The second substrate 8 is a silicon substrate composed of silicon, and is a (100) substrate having a (100) surface. Subsequently, a mask 9 composed of polyether amide is formed over the (100) surface of the second substrate 8. Openings 13 are formed in the mask 9 by photolithography or dry etching. The openings 13 are rectangular and have a diameter of 24 μm. When the openings 13 are to be formed, a support substrate 15 composed of silicon is used. Then, the second substrate 8 having the mask 9 is bonded to the wall members 16 by using a bond aligner (manufactured by SUSS MicroTec AG), as shown in FIG. 2D. During the bonding process, the openings 13 in the mask 9 are used as alignment marks. After the first substrate 2 and the second substrate 8 are bonded to each other, a thermosetting process is performed at 200° C., whereby the first substrate 2 and the second substrate 8 are tightly bonded to each other.

Next, as shown in FIG. 2E, the support substrate 15 is removed, and a protective film 10 with a thickness of 20 μm is formed so as to cover the second substrate 8. The protective film 10 is a cyclized rubber polymer (product name: OBC, manufactured by Tokyo Ohka Kogyo Co., Ltd.) that covers the upper surface and the side surfaces of the second substrate 8, as well as the side surfaces of the first substrate 2.

Subsequently, as shown in FIG. 2F, a laser beam is radiated to the back-surface layer 5 formed over the back surface of the first substrate 2, thereby forming non-through holes 11. With regard to the non-through holes 11, in the cross-sectional view in FIG. 2F, two deep non-through holes are formed in the central area, and two shallow non-through holes are formed at the outer side of the central area. The depth of each deep non-through hole in the central area is 640 μm, and the depth of each shallow non-through hole at the outer side is 10 μm.

Next, as shown in FIG. 2G, an etchant is supplied from the back surface of the first substrate 2. The etchant used is a TMAH aqueous solution with a TMAH concentration of 20% by mass. Thus, anisotropic etching is performed at the first substrate 2, whereby a liquid supply port 12 is formed in the first substrate 2. The etchant reaches the sacrificial layer 4 in 340 minutes from the start of the etching process. Subsequently, the sacrificial layer 4 dissolves in one minute. The etchant reaches the mask 9 substantially simultaneously with the completion of the dissolution of the sacrificial layer 4, and begins etching the second substrate 8 via the openings 13 formed in the mask 9. By etching the second substrate 8, discharge ports 14 are formed in 20 minutes, as shown in FIG. 2H. With regard to each discharge port 14, the discharge-port plane thereof has an opening width of 10 μm, and the inner wall thereof is a surface in which the plane orientation is (111). At the same time, the liquid supply port 12 in the first substrate 2 is completed.

After the liquid supply port 12 and the discharge ports 14 are formed, the protective film 10 is finally removed, whereby a liquid discharge head shown in FIG. 2I is manufactured.

Second Exemplary Embodiment

A second exemplary embodiment differs from the first exemplary embodiment in the composition of the coating liquid applied for forming the photosensitive resin layer 6. The coating liquid contains the following:

59 parts by mass of 3-methoxy-3-methyl-1-butanol, 40 parts by mass of a monomer containing a mixture of methyl methacrylate, methacrylic acid, and tetrahydrofurfuryl methacrylate with a mass ratio of 65/15/20, and 1 part by mass of VPE-0201 (product name, manufactured by Wako Pure Chemical Industries, Ltd.).

In contrast to the first exemplary embodiment in which the second substrate 8 is bonded after developing and removing the flow passage pattern 7, the flow passage pattern 7 is not developed at this point in the second exemplary embodiment. Instead, the flow passage pattern 7 is left in a latent-image state by a proximity exposure process.

Subsequently, the second substrate 8 is bonded in a similar manner to the first exemplary embodiment. After the protective film 10 is formed, the etching process is commenced by supplying the etchant from the back surface of the first substrate 2. The etchant used is a TMAH aqueous solution with a TMAH concentration of 20% by mass. By performing this etching process, the liquid supply port 12 is formed in the first substrate 2, the flow passage pattern (i.e., the photosensitive resin layer 6) in the latent-image state is removed, and the discharge ports 14 are formed in the second substrate 8.

According to the present invention, a liquid discharge head having an orifice plate composed of silicon can be readily manufactured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-138388 filed Jun. 20, 2012, which is hereby incorporated by reference herein in its entirety.

What is claimed is:

1. A method for manufacturing a liquid discharge head including a substrate having a liquid supply port; an energy generating element; and an orifice plate having a liquid discharge port, the method comprising:
- a step of preparing a first substrate having the energy generating element at a front surface side thereof;
- a step of forming a wall member, which is to become a wall for a liquid flow passage, at the front surface side of the first substrate;
- a step of forming a mask having an opening on the wall member and forming a second substrate, which is composed of silicon and is to become the orifice plate, on the mask; and
- a step of forming the liquid supply port in the first substrate and the liquid discharge port in the second substrate by supplying an etchant from a back surface side of the first substrate, the back surface being a surface opposite the front surface.

2. The method according to claim 1, wherein the first substrate is composed of silicon.

3. The method according to claim 1, wherein the liquid supply port is formed in the first substrate and the liquid discharge port is formed in the second substrate by performing anisotropic etching using the etchant.

4. The method according to claim 1, wherein a surface of the second substrate provided with the mask is a surface in which crystal plane orientation is (100).

5. The method according to claim 1, wherein the step of forming the wall member comprises:
- a step of forming a photosensitive resin layer on or above the first substrate; and
- a step of forming the wall member and a flow passage pattern from the photosensitive resin layer by patterning the photosensitive resin layer.

6. The method according to claim 5, wherein the flow passage pattern is a space obtained by removing the photosensitive resin layer.

7. The method according to claim 5, wherein the flow passage pattern comprises the photosensitive resin layer with a latent image of the flow pattern.

8. The method according to claim 1, wherein a non-through hole is formed in the first substrate before the etchant is supplied.

9. The method according to claim 1, wherein a non-through hole is formed in the second substrate before the etchant is supplied.

10. The method according to claim 1, wherein a surface of the second substrate provided with the mask is a surface in which crystal plane orientation is (110).

* * * * *